United States Patent [19]

Hickmann et al.

[11] Patent Number: 4,700,820

[45] Date of Patent: Oct. 20, 1987

[54] TORQUE TRANSFER DEVICE AND ENGAGEABLE, SHIFTABLE CLUTCH IN AN ALL-WHEEL DRIVE ARRANGEMENT FOR A MOTOR VEHICLE

[75] Inventors: Udo Hickmann, Muehlacker; Guenter Ruehle, Bietigheim-Bissingen, both of Fed. Rep. of Germany

[73] Assignee: Dr. Ing. H.c.f. Porsche AG, Weissach, Fed. Rep. of Germany

[21] Appl. No.: 853,560

[22] Filed: Apr. 18, 1986

[30] Foreign Application Priority Data

Apr. 25, 1985 [DE] Fed. Rep. of Germany ....... 3514947

[51] Int. Cl.⁴ ............................................. F16D 47/06
[52] U.S. Cl. ................................. 192/48.5; 192/58 C; 192/85 CA; 192/0.075; 180/233
[58] Field of Search ...................... 74/710, 710.5, 711, 74/687, 731, 752 C; 180/233; 192/0.033, 49, 48.3, 48.8, 0.096, 103 R, 58 B, 0.075, 85 CA, 58 C

[56] References Cited

U.S. PATENT DOCUMENTS

| | | | |
|---|---|---|---|
| 2,983,346 | 5/1961 | Weymann | 192/0.076 |
| 3,845,671 | 11/1974 | Sharp et al. | 74/711 X |
| 3,923,113 | 12/1975 | Pagdin | 74/711 X |
| 4,031,780 | 6/1977 | Dolan et al. | 74/711 |
| 4,048,872 | 9/1977 | Webb | 74/711 |
| 4,280,583 | 7/1981 | Stieg | |
| 4,562,897 | 1/1986 | Renneker | 192/58 B X |

FOREIGN PATENT DOCUMENTS

| | | |
|---|---|---|
| 68309 | 1/1983 | European Pat. Off. |
| 1655669 | 10/1971 | Fed. Rep. of Germany |
| 3239625 | 5/1983 | Fed. Rep. of Germany |
| 3312694 | 11/1983 | Fed. Rep. of Germany |
| 2093416 | 9/1982 | United Kingdom |
| 2139972 | 11/1984 | United Kingdom |

*Primary Examiner*—George H. Krizmanich
*Attorney, Agent, or Firm*—Barnes & Thornburg

[57] ABSTRACT

A multiple-disk visco-clutch is arranged in the drive line of the front axle and the rear axle of a four wheel-drive motor vehicle. In order to prevent an overheating of the multiple-disk visco-clutch, such as when the vehicle is being towed, the visco-clutch is separable from the drive line by means of a shiftable toothed clutch. The lubricating-oil pressure, the intake pipe vacuum or other characteristic quantities of the motor vehicle may be used for actuating the toothed clutch when the internal-combustion engine is stopped, thereby automatically causing the separating of the multiple disk visco-clutch from the drive line.

13 Claims, 1 Drawing Figure

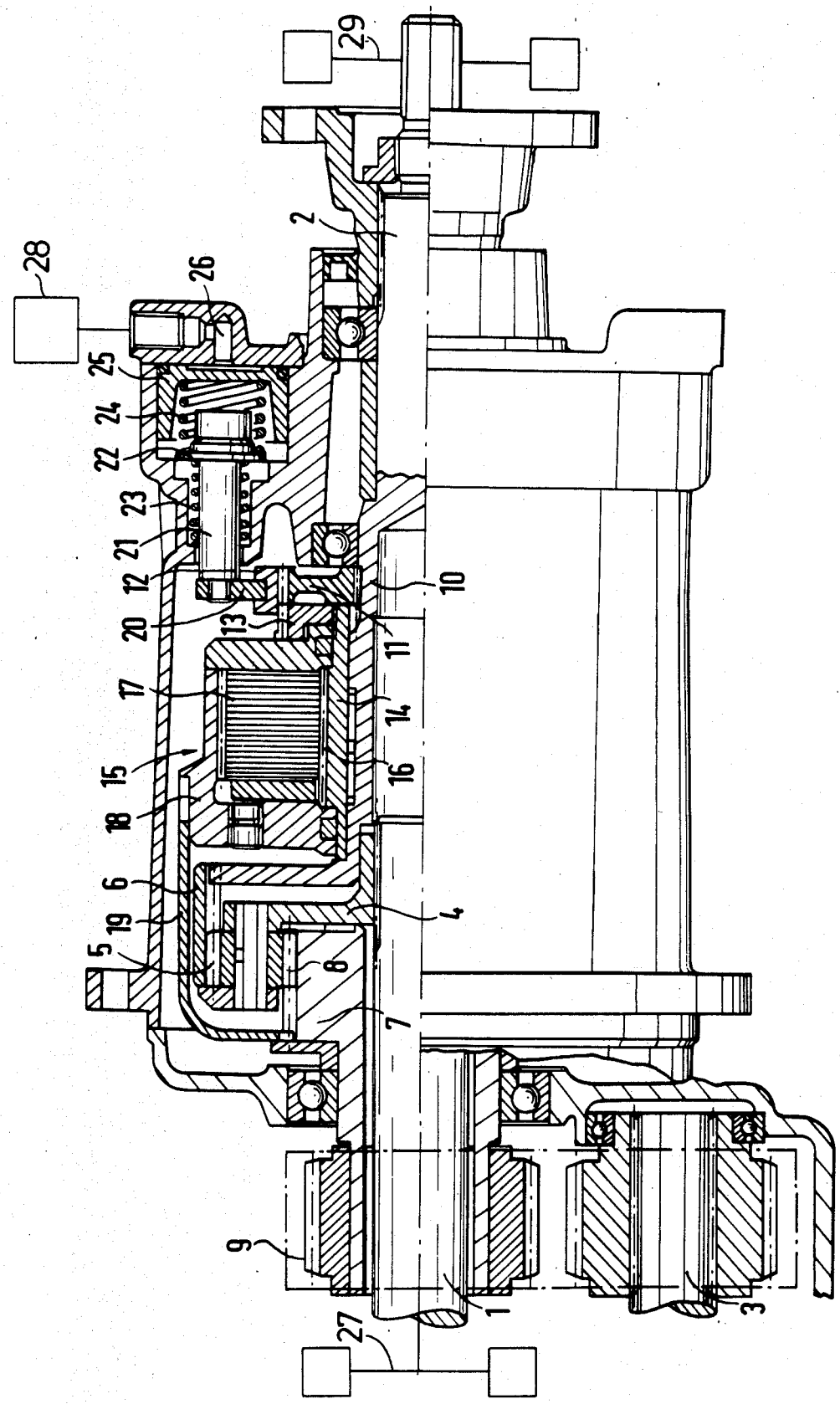

TORQUE TRANSFER DEVICE AND ENGAGEABLE, SHIFTABLE CLUTCH IN AN ALL-WHEEL DRIVE ARRANGEMENT FOR A MOTOR VEHICLE

BACKGROUND AND SUMMARY OF THE INVENTION

This invention relates generally to a four wheel drive for a motor vehicle driven by an internal-combustion engine, and in particular, to a disengagable locking device arranged in the drive line of the front and rear axles.

In German Patent DE-PS No. 35 07 492.2 a permanent four wheel drive is described using a multiple-disk visco-clutch as a torque transfer device. The torque that can be transmitted by the visco-clutch increases as the speed difference between the front and the rear axles becomes greater. When the motor vehicle is towed, this desired behavior will cause difficulties when one axle is lifted onto a towing vehicle and is stopped while the other axle is rolling on the road. In this case, the differential speed, and thus the torque builds up, at the visco-clutch to such a high degree that the visco-clutch will be destroyed within a short period of time by overheating.

It is, therefore, an object of the present invention to provide a four wheel drive having a torque transfer device which cannot be damaged when the motor vehicle is being towed.

The above and other objects are attained according to the invention by providing a torque transfer device arranged in the drive line of the front and rear axles. The torque transfer device provides a torque as a function of the speed difference between the front and rear axles. An engagable shiftable clutch is coupled to the torque transfer for disengaging the same from the drive line of the front and rear axles. Actuation of this clutch before towing as provided by the invention, will prevent damaging of the torque transfer device. In order to ensure a disconnecting of the torque transfer device which does not depend on the driver's attention, however, a preferred embodiment provides the disconnecting as a function of characteristic operating conditions of the motor vehicle or the internal-combustion engine, with the locking device being disengaged automatically when the engine is stopped. In an especially preferred embodiment, operating conditions such as the lubricating-oil pressure or the intake pipe vacuum are advantageously used so that when the internal-combustion engine is started, they rise suddenly from zero to their operating value. In an alternative preferred embodiment, an automatic shifting of the clutch takes place by means of a speed sensor of the internal-combustion engine which supplies an electrical voltage to a lifting magnet. In preferred embodiments, a shiftable clutch which is preferably a commercial available toothed clutch having form-fitting interlocking clutch members is utilized.

Further objects, features, and advantages of the present invention will become more apparent from the following description when taken with the accompanying drawings which show, for purposes of illustration only, an embodiment in accordance with the present invention.

BRIEF DESCRIPTION OF THE DRAWINGS

The single drawing FIGURE is a partial side longitudinal sectional view of a four wheel drive constructed according to a preferred embodiment of the invention.

DETAILED DESCRIPTION OF THE DRAWINGS

A four wheel drive with a torque transfer device arranged between the front axle and the rear axle of a motor vehicle includes a central input shaft 1 starting at the speed-changing gear, a first drive shaft 2 leading to the rear axle 29 and second drive shaft 3 leading to the front axle 30 of the motor vehicle. The hub of a planet carrier 4 is fitted onto a spline profile of the input shaft 1. The planet carrier 4 on one side, via planet wheels 5 disposed thereon, drives a ring gear 6 connected with the drive shaft 2 leading to the rear axle 29. On the other side, the planet carrier 4 drives a sun gear 8 mounted on a hollow shaft 7, the sun gear 8 serving for the actuating of a drive chain 9 and drive shaft 3.

A toothed wheel 11 is mounted on a hollow shaft extension 10 of the ring gear 6 which merges into the drive shaft 2. The teeth of wheel 11 mesh with a toothed socket wheel 12 which, by being pushed longitudinally, can be engaged in a toothed wheel 13 that is fastened on a clutch hub 14 of the multiple-disk visco-clutch 15. The clutch hub 14 is rotationally movable with respect to shaft extension 10. Inner disks 16 of the visco-clutch are, in a rotationally stable manner, connected with the clutch hub 14, whereas the outer disks 17 of the visco-clutch 15 are, in a rotationally stable manner, mounted at a housing 18. The housing 18 meshes with the spline profile of the hollow shaft 7 via a bell housing 19, and is thus connected with the drive shaft 3 in a torque-transmitting way.

When the toothed socket wheel 12 meshes with the two toothed wheels 11 and 13, the multiple-disk visco-clutch 15 is connected into the drive line of the front axle 30 and rear axle 29 as the torque transfer device. In the case of a speed difference between the front axle 30 and the rear axle 29, a torque transfer moment is built up by means of the shearing force of the viscous oil located between the inner disks 16 and the outer disks 17, with the torque transfer moment increasing along a sloped curve with the differential speed.

When the vehicle is towed this torque transfer moment may become so high that the multiple-disk visco-clutch 15 is destroyed by the resulting high overheating. In order to avoid this, the present invention provides that the multiple-disk visco-clutch 15 is separable from the drive line by means of an engagable shiftable toothed clutch. In the illustrated preferred embodiment, a shift fork 20 engages in a surrounding groove of the toothed socket wheel 12, the shift fork being fastened at the front side of an adjusting piston 21. A pressure spring 23 rests against one side of a collar 22 of the adjusting piston 21, with the pressure spring 23 supporting itself in an outer housing 27. The other side of the collar 22 is loaded by a pressure spring 24, which spring rests against the bottom of a hollow hydraulic piston 25. The hydraulic piston 25 is guided in the outer housing 27 in a sealed manner, and via hydraulic bores 26, is connected in a preferred embodiment to the lubricating-oil circulating system of the internal-combustion engine 28, as schematically depicted in the figure. Since the lubricating-oil pressure in the internal-combustion engine 28 is reduced when the internal combustion engine is turned off, the hydraulic piston 25 is also no longer acted upon by pressure. The adjusting piston 21, through the force of the pressure spring 23, is thus returned in its starting postion, and in the process via the shift fork 20, the toothed socket wheel 12 is disengaged from the toothed wheel 13 connected with the clutch hub 14. Thus, when the internal-combustion engine 28 is stopped, the multiple-disk visco-clutch 15 is automatically separated from the drive line of the front and rear axles 30, 29.

As an alternative to being acted upon by the lubricating-oil pressure, another preferred embodiment provides the engagable shiftable toothed clutch to be actuated by the oil pressure of the power steering system of the motor vehicle or by the intake pipe vacuum of the internal-combustion engine 28.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A four wheel drive arrangement for a motor vehicle driven by an internal-combustion engine having a first and a second axle, said arrangement comprising:
   torque transfer means arranged in a drive line of said first and second axles, said torque transfer means providing a torque transfer between said axles as a function of a speed difference between said axles, and
   engageable shiftable clutch means connected to said internal-combustion engine and coupled to said torque transfer means for disengaging said torque transfer means from said drive line of said first and second axle,
   wherein said engageable clutch means is engaged and disengaged as a function of the operation of said internal-combustion engine.

2. The arrangement according to claim 1, wherein the engageable clutch means is engaged and disengaged as a function of a lubricating-oil pressure of said internal-combustion engine.

3. The arrangement according to claim 1, further including a power steering system, wherein the engageable clutch means is engaged and disengaged as a function of an oil pressure of said power steering system of the motor vehicle.

4. The arrangement accordng to claim 1, wherein the engageable clutch means is engaged and disengaged as a function of an intake pipe vacuum of the internal-combustion engine.

5. The arrangement according to claim 1, further including first drive shaft means connected to said second axle and second drive shaft means connected to the said first axle, wherein said torque transfer means includes a multiple-disk visco-clutch means having an inner disk means arranged on a clutch hub means and an outer disk means arranged in a shearing fluid, said clutch hub means being connectable with said first drive shaft means by said engageable clutch means, said outer disk means being mounted at a housing of said multiple-disk visco-clutch means and in a torque-transmitting way connected with said second drive shaft means.

6. The arrangement according to claim 5, wherein said engageable clutch means includes a toothed clutch means.

7. The arrangement according to claim 6, wherein said toothed clutch means includes:
   first toothed wheel means which is rotationably stable at said clutch hub means;
   second toothed wheel means which is rotationably stable with respect to said first drive shaft means;
   toothed socket wheels means which is engageable with said first and second toothed wheel means;
   shift fork means engageable in said toothed socket wheel means;
   resilient means engageable with said shift fork means; and
   piston means for moving said shift fork means against said resilient means.

8. The arrangement according to claim 7, wherein said piston means includes a hydraulic piston.

9. The arrangement according to claim 1, wherein said engageable clutch means includes toothed clutch means.

10. The arrangement according to claim 9, wherein said toothed clutch means includes:
    first toothed wheel means which is rotationably stable at said clutch hub means;
    second toothed wheel means which is rotationably stable with respect to said first drive shaft means;
    toothed socket wheels means which is engageable with said first and second toothed wheel means;
    shift fork means engageable in said toothed socket wheel means;
    resilient means engageable with said shift fork means; and
    piston means for moving said shift fork means against said resilient means.

11. A four wheel drive arrangement for a motor vehicle driven by an internal-combustion engine having a first and a second axle, said arrangement comprising:
    torque transfer means arranged in a drive line of said first and second axles, said torque transfer means providing a torque transfer between said axles as a function of a speed difference between said axles;
    engageable shiftable clutch means connected to said internal-combustion engine and coupled to said torque transfer means for disengaging said torque transfer means from said drive line of said first and second axle;
    first drive shaft means connected to said second axle and second drive shaft means connected to said second axle and second drive shaft means connected to the said first axle, wherein said torque transfer means includes a multiple-disk visco-clutch means having an inner disk means arranged on a clutch hub means and an outer disk means arranged in a shearing fluid, said clutch hub means being connectable with said first drive shaft means by said engageable clutch means, said outer disk means being mounted at a housing of said multiple-disk visco-clutch means and in a torque-transmitting way connected with said second drive shaft means;
    wherein said engageable clutch means includes a toothed clutch means; and
    wherein said toothed clutch means includes:
    first toothed wheel means which is rotationably stable at said clutch hub means;
    second toothed wheel means which is rotationably stable with respect to said first drive shaft means;
    toothed socket wheels means which is engageable with said first and second toothed wheel means;

shift fork means engageable in said toothed socket wheel means;

resilient means engageable with said shift fork means; and piston means for moving said shift fork means against said resilient means.

12. The arrangement according to claim 11, wherein said piston means includes a hydraulic piston.

13. A four wheel drive arrangement for a motor vehicle driven by an internal-combustion engine having a first and a second axle, said arrangement comprising:

torque transfer means arranged in a drive line of said first and second axles, said torque transfer means providing a torque transfer between said axles as a function of a speed difference between said axles;

engageable shiftable clutch means connected to said internal-combustion engine and coupled to said torque transfer means for disengaging said torque transfer means from said drive line of said first and second axle;

wherein said engageable clutch means includes toothed clutch means; and wherein said toothed clutch means includes:

first toothed wheel means which is rotationably stable at said clutch hub means;

second toothed wheel means which is rotationably stable with respect to said first drive shaft means;

toothed socket wheels means which is engageable with said frst and second toothed wheel means;

shift fork means engageable in said toothed socket wheel means;

resilient means engageable with said shift fork means; and piston means for moving said shift fork means against said resilient means.

* * * * *